(12) United States Patent
Jawale et al.

(10) Patent No.: US 11,599,713 B1
(45) Date of Patent: Mar. 7, 2023

(54) SUMMARIZING CONVERSATIONAL SPEECH

(71) Applicant: Rammer Technologies, Inc., Seattle, WA (US)

(72) Inventors: Toshish Arun Jawale, Seattle, WA (US); Sekhar Vallath, Pune (IN); Pratik Abhaykumar Budruk, Aitawade Budruk (IN)

(73) Assignee: Rammer Technologies, Inc., Seattle, WA (US)

( * ) Notice: Subject to any disclaimer, the term of this patent is extended or adjusted under 35 U.S.C. 154(b) by 0 days.

(21) Appl. No.: 17/874,107

(22) Filed: Jul. 26, 2022

(51) Int. Cl.
| | |
|---|---|
| G10L 15/00 | (2013.01) |
| G06F 40/166 | (2020.01) |
| G10L 15/22 | (2006.01) |
| G10L 15/02 | (2006.01) |
| G10L 15/18 | (2013.01) |
| G10L 15/30 | (2013.01) |
| G10L 15/04 | (2013.01) |
| G10L 15/26 | (2006.01) |

(52) U.S. Cl.
CPC ............ G06F 40/166 (2020.01); G10L 15/02 (2013.01); G10L 15/04 (2013.01); G10L 15/1815 (2013.01); G10L 15/22 (2013.01); G10L 15/30 (2013.01); G10L 15/26 (2013.01)

(58) Field of Classification Search
CPC combination set(s) only.
See application file for complete search history.

(56) References Cited

U.S. PATENT DOCUMENTS

| | | | |
|---|---|---|---|
| 7,814,048 B2 | 10/2010 | Zhou et al. | |
| 8,577,671 B1 | 11/2013 | Barve et al. | |
| 9,201,927 B1 | 12/2015 | Zhang | |
| 9,367,608 B1 | 6/2016 | Zhang | |
| 10,754,883 B1 | 8/2020 | Kannu et al. | |

(Continued)

FOREIGN PATENT DOCUMENTS

CN 111191450 A 5/2020

OTHER PUBLICATIONS

Office Communication for U.S. Appl. No. 17/246,495 dated Jun. 28, 2021, pp. 1-26.

(Continued)

*Primary Examiner* — Vu B Hang
(74) *Attorney, Agent, or Firm* — John W. Branch; Branch Partners PLLC

(57) ABSTRACT

Embodiments are directed to summarizing conversational speech. Conversation segments may be provided based on a conversation stream and segmentation models. Summarization models may be determined based on characteristics of the conversation segments. Summarization information may be generated for each of the conversation segments based on the summarization models such that the summarization information includes a text-based summarization of the conversation segment. Summarization profiles may be generated for the conversation segments based on the summarization information such that each summarization profile is associated with quality scores. Summarization models may be modified based on the summarization profiles and the associated quality scores such that the summarization profiles are updated based on the modified summarization models. Modified summarization models and the updated summarization profiles may be employed to provide reports to a user.

28 Claims, 11 Drawing Sheets

(56) References Cited

U.S. PATENT DOCUMENTS

| | | |
|---|---|---|
| 11,093,718 B1 | 8/2021 | Jawale et al. |
| 11,132,988 B1 | 9/2021 | Steedman Henderson et al. |
| 11,263,407 B1 | 3/2022 | Jawale et al. |
| 2004/0243388 A1 | 12/2004 | Corman et al. |
| 2005/0278325 A1 | 12/2005 | Mihalcea et al. |
| 2007/0156625 A1 | 7/2007 | Visel |
| 2013/0046531 A1 | 2/2013 | Chandramouli et al. |
| 2015/0006155 A1 | 1/2015 | Tanigaki et al. |
| 2015/0032441 A1 | 1/2015 | Marcus |
| 2015/0095770 A1 | 4/2015 | Mani et al. |
| 2015/0186504 A1 | 7/2015 | Gorman et al. |
| 2015/0286629 A1 | 10/2015 | Abdel-Reheem et al. |
| 2016/0179945 A1 | 6/2016 | Lastra Diaz et al. |
| 2016/0306791 A1 | 10/2016 | Allen et al. |
| 2016/0316059 A1 | 10/2016 | Nuta et al. |
| 2017/0053206 A1 | 2/2017 | Kala et al. |
| 2017/0212884 A1 | 7/2017 | Kim et al. |
| 2017/0249668 A1 | 8/2017 | Delort |
| 2017/0270096 A1 | 9/2017 | Sheafer et al. |
| 2017/0277781 A1 | 9/2017 | Deolalikar |
| 2017/0316777 A1 | 11/2017 | Perez et al. |
| 2018/0165554 A1 | 6/2018 | Zhang et al. |
| 2018/0351899 A1 | 12/2018 | Kano et al. |
| 2018/0373696 A1 | 12/2018 | Terry et al. |
| 2019/0005329 A1 | 1/2019 | Misra et al. |
| 2019/0042988 A1 | 2/2019 | Brown et al. |
| 2019/0294668 A1 | 9/2019 | Goel et al. |
| 2019/0332668 A1 | 10/2019 | Wang et al. |
| 2019/0378513 A1 | 12/2019 | Carnevale et al. |
| 2019/0384813 A1 | 12/2019 | Mahmoud |
| 2020/0004517 A1 | 1/2020 | Legler |
| 2020/0005117 A1 | 1/2020 | Yuan et al. |
| 2020/0110943 A1 | 4/2020 | Gunawardena |
| 2020/0143115 A1 | 5/2020 | Brigham et al. |
| 2020/0243094 A1 | 7/2020 | Thomson et al. |
| 2020/0279017 A1 | 9/2020 | Norton et al. |
| 2021/0004443 A1 | 1/2021 | Sapugay et al. |
| 2021/0042467 A1 | 2/2021 | Liu et al. |
| 2021/0104014 A1 | 4/2021 | Kolb, V et al. |
| 2021/0374677 A1 | 12/2021 | Michels |

OTHER PUBLICATIONS

Office Communication for U.S. Appl. No. 17/246,463 dated Jul. 1, 2021, pp. 1-9.

Office Communication for U.S. Appl. No. 17/246,463 dated Jul. 8, 2021, pp. 1-6.

Office Communication for U.S. Appl. No. 17/246,495 dated Oct. 12, 2021, pp. 1-29.

Office Communication for U.S. Appl. No. 17/389,145 dated Nov. 30, 2021, pp. 1-9.

Office Communication for U.S. Appl. No. 17/246,495 dated Jan. 5, 2022, pp. 1-29.

Office Communication for U.S. Appl. No. 17/523,355 dated Feb. 3, 2022, pp. 1-11.

Office Communication for U.S. Appl. No. 17/523,355 dated Mar. 1, 2022, pp. 1-8.

Office Communication for U.S. Appl. No. 17/389,145 dated Mar. 10, 2022, pp. 1-10.

Office Communication for U.S. Appl. No. 17/523,355 dated Mar. 16, 2022, pp. 1-9.

Office Communication for U.S. Appl. No. 17/717,055 dated Jun. 13, 2022, pp. 1-30.

Office Communication for U.S. Appl. No. 17/682,682 dated Jul. 7, 2022, pp. 1-28.

Siddiqui, Nadia et al., "ConVisQA: A Natural Language Interface for Visually Exploring Online Conversations," 2020 24th International Conference Information Visualisation (IV), 2020, pp. 440-447.

Vilhjálmsson, Hannes Högni, "Augmenting Online Conversation through Automated Discourse Tagging," In Proceedings of the 38th Annual Hawaii International Conference on System Sciences, Jan. 2005, pp. 1-10.

Office Communication for U.S. Appl. No. 17/839,274 dated Aug. 17, 2022, pp. 1-11.

```
                                                                ┌─ 800
802 ──┐
       "summary": [
804 ──▶ {
            "id": "3498579583479",
808 ──▶    "metadata": {
                "speakers" : ["John", "Mark",...],
                "host": "John",
810 ──▶        "critical-topics": [
                    { "topic": "deadline",
                      "duration":"1.10s",
                      "speakers": [],
                      "messageRefs": [],
                      ...
                    },
                    { "topic": "feature request"
                      ...
                    }
                ]
            }
812 ──▶    "text": "John and Paul need to...they should focus on.",
814 ──▶    "messageRefs": [
                {
                    "id": "248594875984"
                },
                {
                    "id": "244394875984"
                },
                ...
            ]
        },
806 ──▶ {
            "id": "4385738475683",
            "text": "Mark and Tim will...simplifies things on their end.",
            "messageRefs": [
                {
                    "id": "938475984357"
                },
                {
                    "id": "458375843755"
                },
                ...
            ]
        }
```

*Fig. 8*

SUMMARIZING CONVERSATIONAL SPEECH

TECHNICAL FIELD

The present invention relates generally to processing natural language speech, and more particularly, but not exclusively to, summarizing conversational speech.

BACKGROUND

Machine processing or analysis of conversational speech and associated activity is becoming increasing important to organizations. Accordingly, organizations may endeavor to capture or analyze speech generated during private/internal meetings, public presentations, customer interactions, or the like. Conventionally, organizations may employ machine transcription services, human transcription services, or hybrid machine-human transcription services to transform natural speech into text suitable for machine analysis, processing, or indexing. Accordingly, organizations may develop databases, search engines, or the like, that enable users to perform analysis of the contents of the captured speech, such as, word/phrase identification (e.g., searching), context free statistical analysis (e.g., word counts, word distributions, or the like), and so on. In some cases, organizations may devote significant resources to train or attempt to train machine learning models that may provide additional insights about conversations. However, the variations in speech patterns, mid-conversation context switches, domain specific vocabulary, culturally specific vocabulary, varying number of speakers in one conversation, background activity/sounds, or the like, may make it prohibitively expensive or impossible to train the machine learning models necessary for gaining additional insights, including summaries, from captured conversations. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 8 illustrates a representation of a data structure for summarizing conversational speech in accordance with one or more of the various embodiments;

DETAILED DESCRIPTION OF VARIOUS EMBODIMENTS

Figure 1:
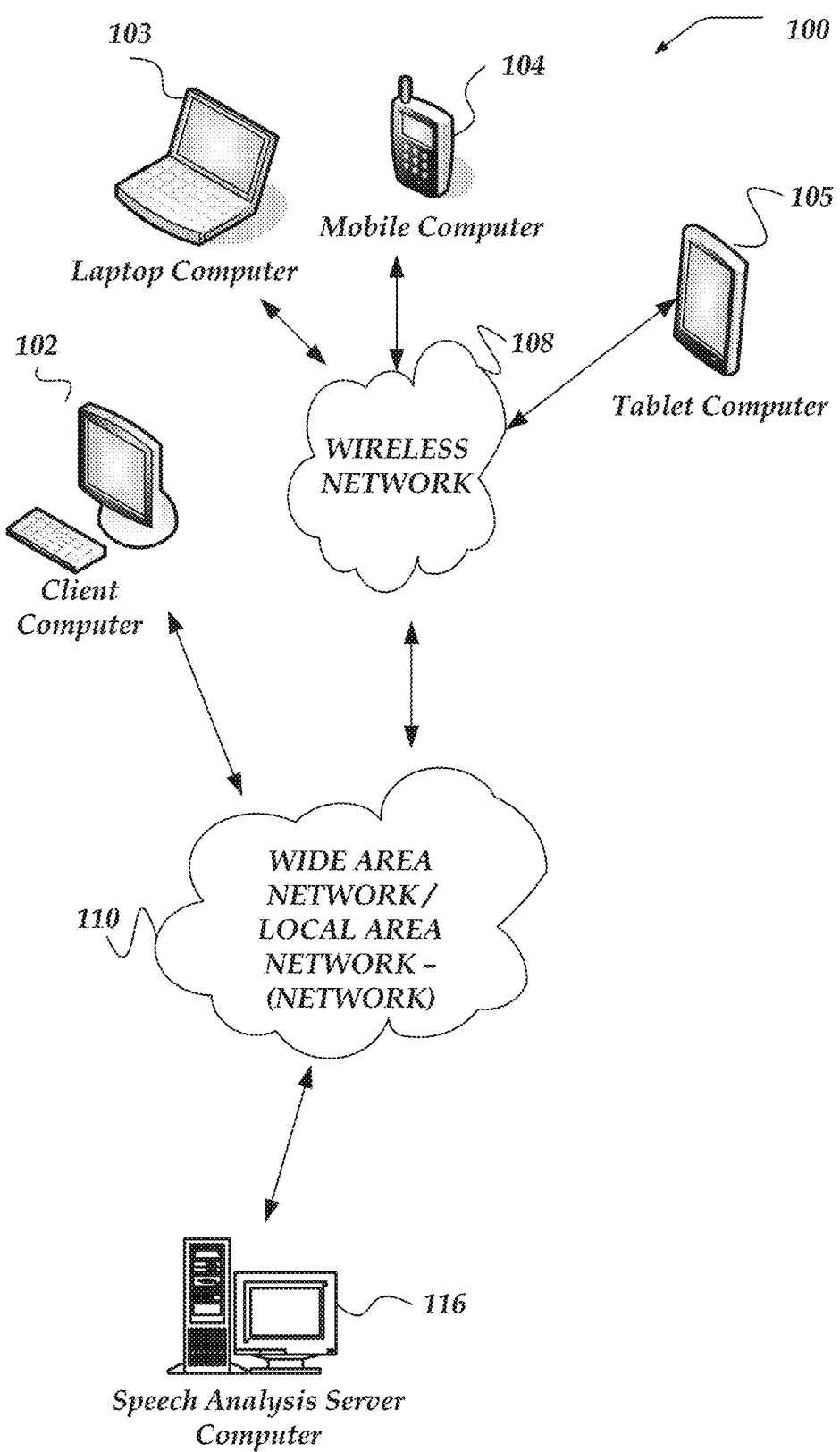
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, Rust, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "conversation" refers to a time-bound exchange of communicative speech between two or more persons. A conversation may be considered time-bound because they have a definite start time and end time. In some cases, a conversation may be a portion of larger conversation, but the conversation (the sub-conversation) may still have its own start time and end time. Also, conversations may be considered synchronous communication among or between two or more people. In some cases, a conversation may include only one speaker that is speaking to other persons (e.g., speeches, presentations, or the like). Conversations may occur in meetings, teleconferences, video conferences, presentations, speeches, or the like. In some cases, conversations may be recorded for playback later. Conversations may include multiple speakers, some who may be more important or more relevant than others. Typically, conversations may include one or more main subjects and one or more topics associated with the main subject. However, reflective of how person communicate, conversations may include portions that may be unrelated to a main subject of topic. For example, in some cases, conversations may include so-called small-talk, irrelevant cross-talk, side discussions, tangential discussions, or the like. Also, conversations, even though conversations may be comprised of synchronous communication exchanges, the subject or topic under consideration may jump around. Even speakers or presenters using well-defined outlines or agenda may jump back and forth within their outline/agenda. Further, in some cases, conversations may include a combination of speech, text chats, emails, or the like. In some cases, a conversation may be considered to be a stream of inputs, such as, text, video, audio, spatial information, or the like, that may be provided. In some cases, one conversation may include sub-conversation of different modalities. For example, a conversation that includes two persons speaking may include a text/speech conversation, a video conversation, an audio conversation, or the like, all occurring at the same time.

As used herein the term "configuration information" refers to information that may include rule based policies, pattern matching, scripts (e.g., computer readable instructions), or the like, that may be provided from various sources, including, configuration files, databases, user input, plug-ins, extensions, loadable libraries, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to summarizing conversational speech. In one or more of the various embodiments, one or more conversation segments may be provided based on a conversation stream and one or more segmentation models.

In one or more of the various embodiments, one or more summarization models may be determined based on one or more characteristics of the one or more conversation segments.

In one or more of the various embodiments, summarization information may be generated for each of the conversation segments based on the one or more summarization models such that the summarization information includes a text-based summarization of the conversation segment.

In one or more of the various embodiments, one or more summarization profiles may be generated for the one or more conversation segments based on the summarization information such that each summarization profile is associated with one or more quality scores.

In one or more of the various embodiments, the one or more summarization models may be modified based on the one or more summarization profiles and the associated one or more quality scores such that the one or more summarization profiles are updated based on the modified summarization models.

In one or more of the various embodiments, the one or more modified summarization models and the one or more updated summarization profiles may be employed to provide one or more reports to a user.

In one or more of the various embodiments, determining the one or more summarization models may include: determining one or more of a subject matter or an industry market based on speech associated with the one or more conversation segments; categorizing the one or more conversation segments based on the one or more of the subject matter or the industry market; further determining the one or more summarization models based on the categorization of the one or more conversation segments; or the like.

In one or more of the various embodiments, generating the one or more summarization profiles may include: determining one or more metrics based on the one or more summary models such that the one or more metrics include one or more of an indication of a status of a customer service issue, a timestamp associated with one or more mentions of a topic, a count of the number of mentions of a topic, an adherence to a script score, or the like; determining one or more values for the one or more metrics based on the one or more summary models and the one or more conversation segments; including the one or more metrics in the one or more summary profiles; or the like.

In one or more of the various embodiments, providing the one or more conversation segments includes: determining one or more portions of the conversation stream that may be superfluous based on the one or more summarization models such that the one or more superfluous portions of the conversation include speech that may be unrelated to a topic of the conversation, speech associated with administering the conversation, or speech associated with a side conversation; excluding the one or more superfluous portions of the conversation stream from the one or more conversation segments; or the like.

In one or more of the various embodiments, generating the summarization information for each of the conversation segments includes: determining one or more conversation types based on the one or more conversation segments based on the one or more summarization models such that the one or more conversation types include one or more of text from an email, text from a chat session, a two-person telephone call, a group meeting, a presentation, or the like; further generating the summarization information based on the one or more conversation types and the one or more summarization models; or the like.

In one or more of the various embodiments, generating the summarization information for each of the conversation segments includes: associating one or more weight scores with one or more features of each of the conversation segments; determining a portion of the one or more features that are associated with one or more of a grammar, a figure of speech, or punctuation; reducing a value of the portion of the one or more weight score that are associated with the determined portion of the one or more features; or the like.

In one or more of the various embodiments, generating the one or more summarization profiles includes: providing metadata information based on the conservation stream and one or more conversations associated with the conversation stream such that the metadata information includes one or more of a list of speakers, a name of the host or leader of the conversation, a duration of the one or more conversations, a list of topics discussed in the one or more conversations, geographic information associated with the conversation, localization information, or the like.

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)— (network) 110, wireless network 108, client computers 102-105, speech analysis server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, speech analysis server computer 116, or other computers.

Client computers 102-105 may further be configured to include a client application that enables an end-user to log into an end-user account that may be managed by another computer, such as v speech analysis server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by speech analysis server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, speech analysis server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of speech analysis server computer 116 are described in more detail below in conjunction with FIG. 3. Although FIG. 1 illustrates speech analysis server computer 116, or the like, each as a single computer, the innovations or embodiments are not so limited. For example, one or more functions of speech analysis server computer 116, or the like, may be distributed across one or more distinct network computers. Moreover, in one or more embodiments, speech analysis server computer 116 may be implemented using a plurality of network computers. Further, in one or more of the various embodiments, speech analysis server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
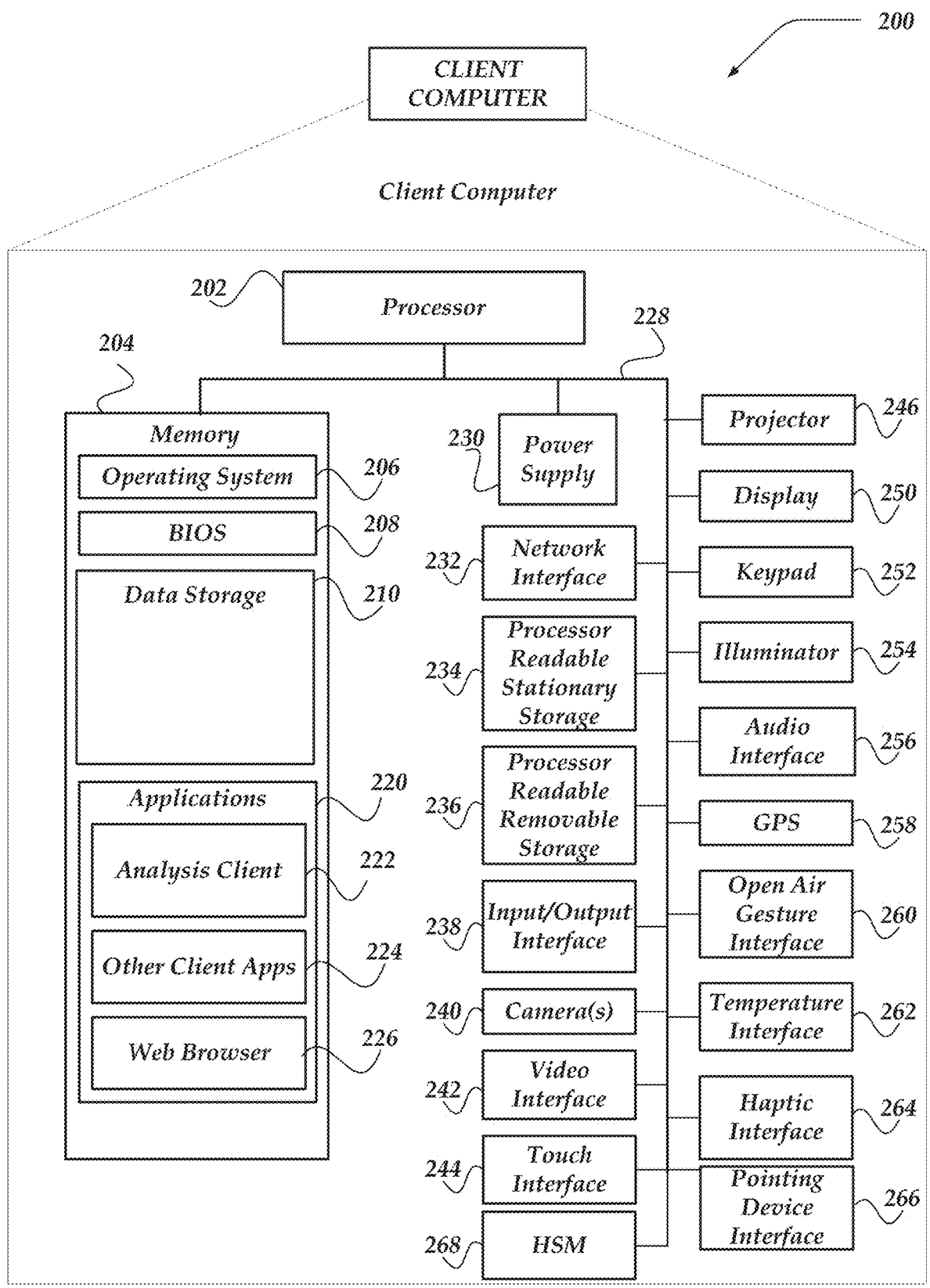
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, speech analysis client 222, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, analysis client 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
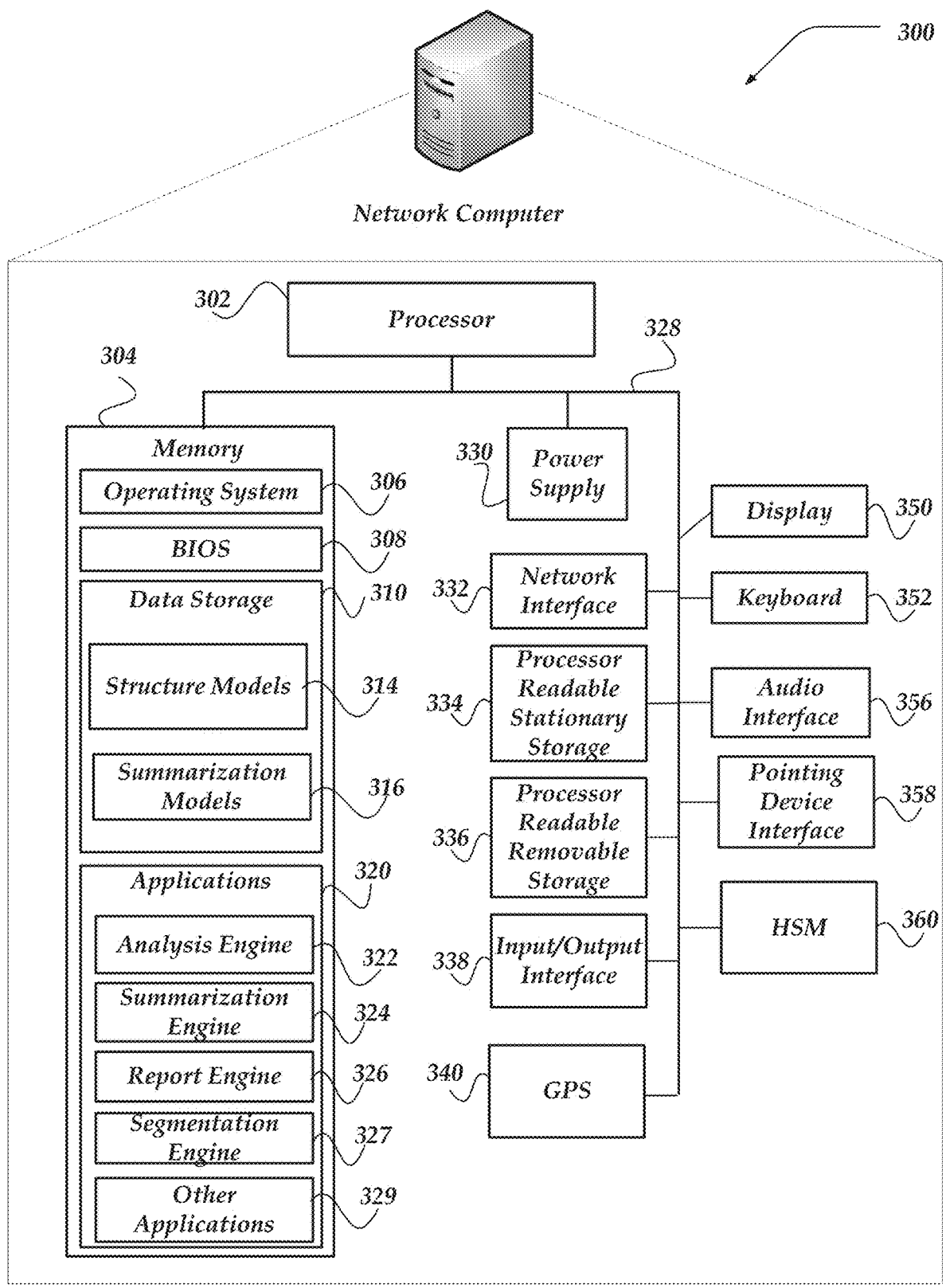
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of speech analysis server computer 116, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, analysis engine 322, summarization engine 324, report engine 326, segmentation engine 327, other applications 329, or the like, may be arranged to employ geo-location information to select one or more localization features, such as, time zones, languages, currencies, currency formatting, calendar formatting, or the like. Localization features may be used in user interfaces, dashboards, reports, speech/text summarizations, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, universal generalization models 314, tracker models 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include analysis engine 322, summarization engine 324, report engine 326, segmentation engine 327, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, analysis engine 322, summarization engine 324, report engine 326, segmentation engine 327, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to analysis engine 322, summarization engine 324, report engine 326, segmentation engine 327, other applications 329, or the like, may be provisioned and de-commissioned automatically.

Also, in one or more of the various embodiments, analysis engine 322, summarization engine 324, report engine 326, segmentation engine 327, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing, or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
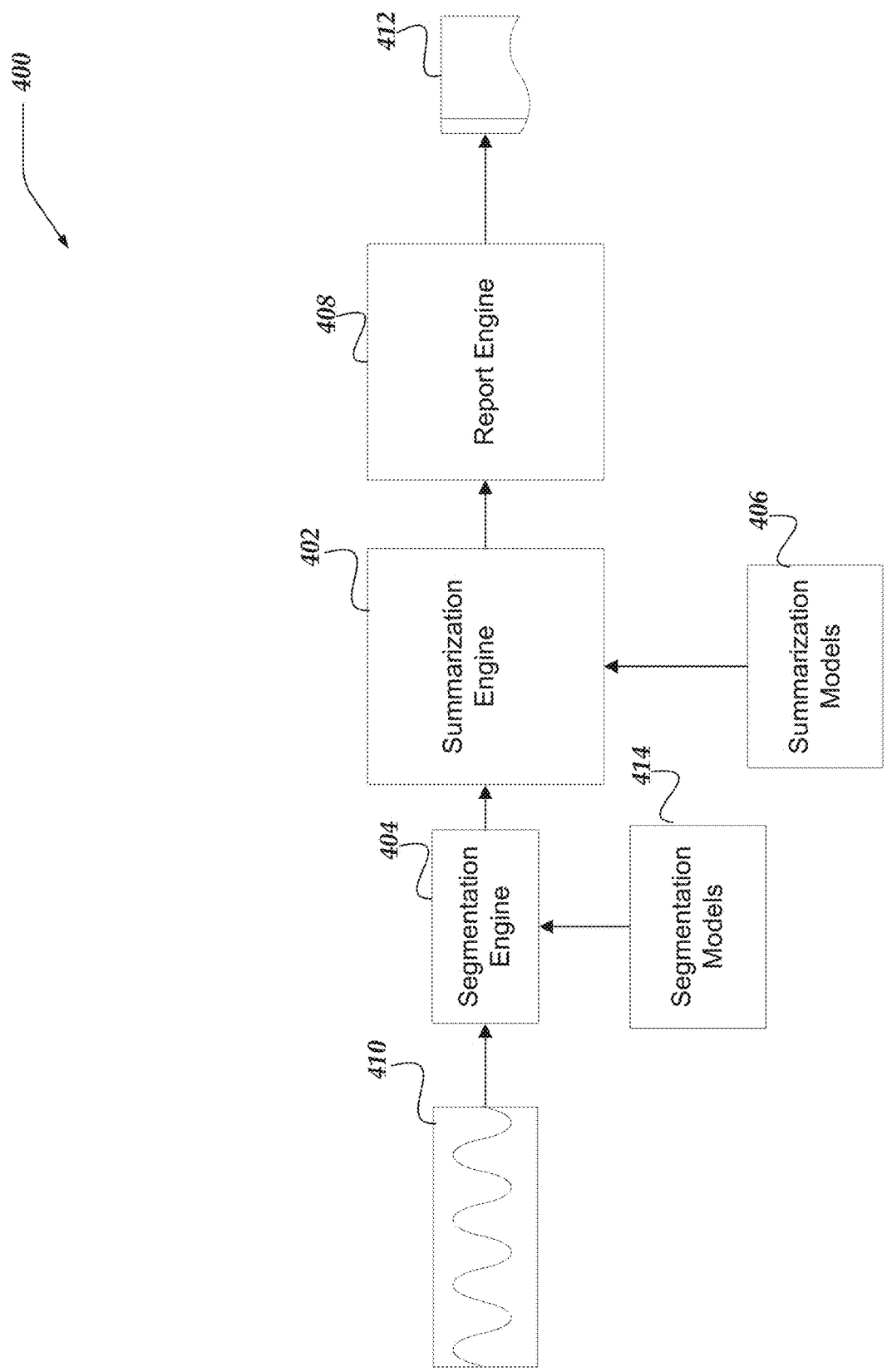
FIG. 4 represents a logical schematic of system for summarizing conversational speech in accord in accord with one or more of the various embodiments.

FIG. 4 represents a logical schematic of system 400 for summarizing conversational speech in accordance with one or more of the various embodiments. In one or more of the various embodiments, system for summarizing conversational speech may include various components, including: one or more summarization engines, such as, summarization engine 402, one or more segmentation engines, such as, segmentation engine 404; one or more summarization models, such as, summarization models 406; one or more report engines, such as, report engine 408; or the like.

In one or more of the various embodiments, conversation streams, such as, conversation stream 410 may be provided to a segmentation engine, such as, segmentation engine 404. Accordingly, in some embodiments, segmentation engine 404 may be arranged to segment a conversation stream into contextual chunks based on NLP, or the like, that may be arranged to determine breaks in the conversation. In one or more of the various embodiments, different strategies may be selected for determining conversation segments. Accordingly, in some embodiments, segmentation engines may be arranged to employ one or more segmentation models, such as, segmentation models 414 that include the particular instructions, machine-learning models, heuristics, or the like, employed for determining conversation segments from conversation streams. Accordingly, in some embodiments, segmentation engines may be arranged to determine one or more segmentation models based on configuration information to account for local circumstances or local requirements.

In some embodiments, the conversation segments may be provided to summarization engine 402, or the like. Accordingly, in some embodiments, summarization engines may be arranged to evaluate the conversation segments that comprise a conversation and generate one or more summaries based on one or more of the segments. In some embodiments, summarization engines may be arranged to employ one or more summarization models that may be configured to summarize one or more segments from a conversation stream into a summary profile.

Accordingly, in some embodiments, the one or more summary profiles generated by summarization engine 402 may be provided to report engine 408. In some embodiments, report engines, such as, report engine 408 may be arranged to generate one or more reports that include the summary profiles or other summary information for conversation stream 410. In this example, report 412 may be considered to represent a summarization report generated by a report engine, such as, report engine 408. Note, in some embodiments, reports may comprise documents, graphical visualizations, interactive user interfaces (e.g., interactive reports or dashboards), or the like. In some embodiments, summarization engines may be arranged to provide summary information in formats (e.g., JSON, XML, or the like) that enable various reports to be generated from the information provided by the summarization engines. One of ordinary skill in the art will appreciate speech analysis platforms may provide support various types of reporting. Accordingly, in some embodiments, report engines may be arranged to employ plug-ins, extensions, instructions, or the like, that may be provided via configuration information to account for local requirements or local circumstances. Likewise, in some embodiments, summarization engines may be arranged to provide summarization profiles to other/external services that may provide reporting/visualization services.

In one or more of the various embodiments, conversation streams provided via conversation stream 410 may be converted into text. In some embodiments, a speech analysis platform may be arranged to employ conventional or customized speech-to-text facilities to convert audio conversation streams into text suitable for additional processing. In some embodiments, the text version of the conversation may be associated with indexes, timestamps, or counter values that may correspond to the timeline of the conversation. Thus, in some embodiments, speech analysis platforms may be enabled to associate various words in a text transcript of the conversation with the time they appeared in the audio stream or the conversation timeline. Further, in some embodiments, conversation streams may include statements/speech of multiple speakers in the same stream. For example, if the conversation stream is a customer service representative speaking with a customers, the conversation stream may include the conversation of the customer service representative and the customer. Likewise, in some embodiments, if the conversation stream is based on a four person meeting, conversation of each person may be included in the same conversation stream.

In one or more of the various embodiments, analysis platforms may be arranged to provide one or more pre-built summarization models that may be associated with one or more concepts or activities. In some embodiments, the one or more pre-built summarization models may be provided in libraries or collections that may be directed to different industries or activity categories. In some embodiments, analysis engines may provide one or more summarization model libraries directed to specific categories of activities or conversations, such as, customer service calls, tele-medicine, contract negotiations, legal hearings, sales activity, marketing research, or the like. Likewise, in some embodiments, analysis engines may provide one or more summarization model libraries directed to concepts, such as, customer experience, mental health, emotional well-being, or the like.

In one or more of the various embodiments, analysis platforms may be arranged to provide one or more pre-built summarization models that may be directed to different conversation types, such as, speech, text from emails, text from text chat sessions, two-person calls/meetings, group calls/meetings, presentations, or the like.

Accordingly, in some embodiments, pre-built summarization model libraries may include one or more summarization models that may be based on vocabularies associated with the concepts or activities the summarization libraries may be directed towards. Thus, in some embodiments, analysis engines may be arranged to provide user interfaces that enable users to select from among pre-built summarization models.

In one or more of the various embodiments, summarization engines may be arranged to provide summarization results for based on different summarization models. Accordingly, in some embodiments, users may be enabled to select preferred summarization results. Accordingly, in some embodiments, summarization engines may be arranged to score summarization models based on user preference indicators. Thus, in some embodiments, overtime, summarization models that outperform other summarization models may be prioritized. In some embodiments, multiple summarization models may be tested/graded during training runs or for selected users. Accordingly, in some embodiments, summarization models associated with result scores/ranking that exceed a threshold value may be selected for employment in non-training circumstances.

Also, in some embodiments, analysis engines, summarization engines, or segmentation engines may be arranged to provide a plug-in architecture or support for dynamic libraries to enable support for different types of modeling, additional speech modalities, new conversation types, or the like.

Figure 5:
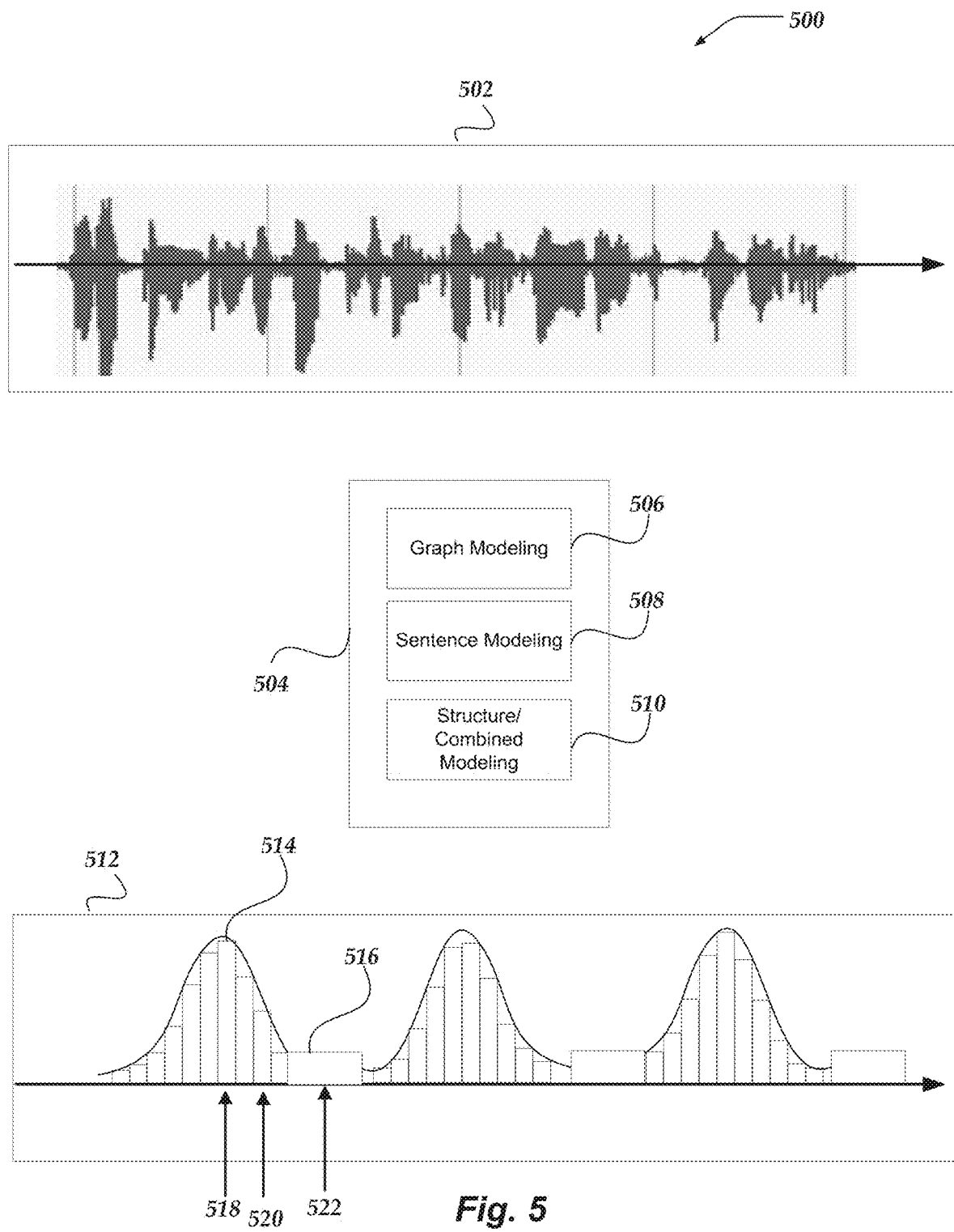
FIG. 5 represents a logical schematic of a system for segmenting conversational speech for summarizing conversational speech in accord in accord with one or more of the various embodiments.

FIG. 5 represents a logical schematic of system 500 for segmenting conversational speech for summarizing conversational speech in accordance with one or more of the various embodiments. In one or more of the various embodiments, speech analysis platforms may be arranged to accept audio streams of conversations, such as, audio stream 502. In some embodiments, audio stream 502 may be a recorded audio file that may be processed after the conversation has concluded. In some embodiments, audio streams, such as, audio stream 502 may be real-time streams of audio provided as a conversation is happening.

In one or more of the various embodiments, audio stream 502 may be provided to a speech analysis platform, that includes a segmentation engine, such as, segmentation engine 504. In some embodiments, segmentation engines may be arranged to include various components or sub-engines, such as, graph modeling engine 506, sentence modeling engine 508, combined modeling engine 510, or the like. In some embodiments, graph modeling engine 506, sentence modeling engine 508, combined modeling engine 510 may be arranged to perform one or more actions for determining conversational structure from speech that may be employed to segment conversation streams.

In one or more of the various embodiments, segmentation engines may be arranged to generate conversation digests, such as, conversation digest 512 based on audio streams, such as, audio stream 502. In one or more of the various embodiments, conversation digests may be data structures that represent conversation audio streams (speech). In some embodiments, conversation digests may be arranged to enable speech analysis engines or summarization engines (not shown) to reliably interpret one or more characteristics of conversations. In some embodiments, conversation digests may be arranged to represent the contextual structure of a conversation.

In one or more of the various embodiments, conversation digests may be arranged to represent a conversation as a sequence of topic portions and connection portions. In some embodiments, topic portions may be portion of a conversation that include material topic information. In contrast, in some embodiments, connection portions of a conversation represent the transition from one topic portion to another. In some embodiments, topic portions may be referred to as blocks and connection portions may be referred to as hinges. Herein, the terms topic portions and connection portions may be considered to mean the same thing as block and hinges. For brevity and clarity, the term blocks will used to represent the topic portions of conversation digests and the term hinges will be used to represent the connection portion of conversation digests.

In this example, for some embodiments, conversation digest 512 includes one or more blocks, such as, block 514 and one or more hinges, such as, hinge 516. Further, in some embodiments, blocks may be associated with one or more topics or sub-topics of a conversation. In this example, block 514 includes topic 518 and sub-topic 520. In one or more of the various embodiments, topics may correspond to key words in the conversation. In some blocks, there may be one word that may be determined to the key topic while some other words may be sub-topics that are related to the key topic. Also, in some embodiments, some words that occur in the part of conversation corresponding to a block may not be topics. In this example, topic 518 may be considered a key topic while topic 520 may be sub-topic related to topic 518.

Further, conversations or portions of conversations occur over a period of time from start to finish. Accordingly, in some embodiments, the time sequence or timeline of the actual conversation may be maintained in the corresponding conversation digest. In this example, timeline 522 represents the time sequence of audio stream 502 and conversation digest 512. Thus, in some embodiments, the first block (e.g., block 514) of a conversation digest may correspond to the beginning of its source audio stream.

In one or more of the various embodiments, audio streams, such as, audio stream 502 may be converted into text. In some embodiments, a speech analysis platform may be arranged to employ conventional or customized speech-to-text facilities to convert audio streams of conversations into text suitable for additional processing. In some embodiments, the text version of the conversation may be associated with index or counter values that may correspond to the timeline of the conversation. Thus, in some embodiments, speech analysis platforms may be enabled to associate various words to when they appeared in the audio stream or the conversation timeline.

In one or more of the various embodiments, summarization engines may be arranged to segment conversations using different segmentation schemes implemented in one or more summarization models. In some embodiments, conversations may be segmented based on a combination of NLP heuristics, machine learning classifiers, time-duration of segments, word counts, user selection, or the like. In some embodiments, speech analysis platforms may be arranged to enable organizations to employ different segmentation engines or different segmentation models depending on their applicability or availability. Further, in some embodiments, conversation digests, such as, conversation digest 512 may be employed to associate or identify portions of the conversation with different topics, speakers, or the like. In some embodiments, some conversations may comprise a single segment while other conversations may comprise more than segments.

Figure 6:
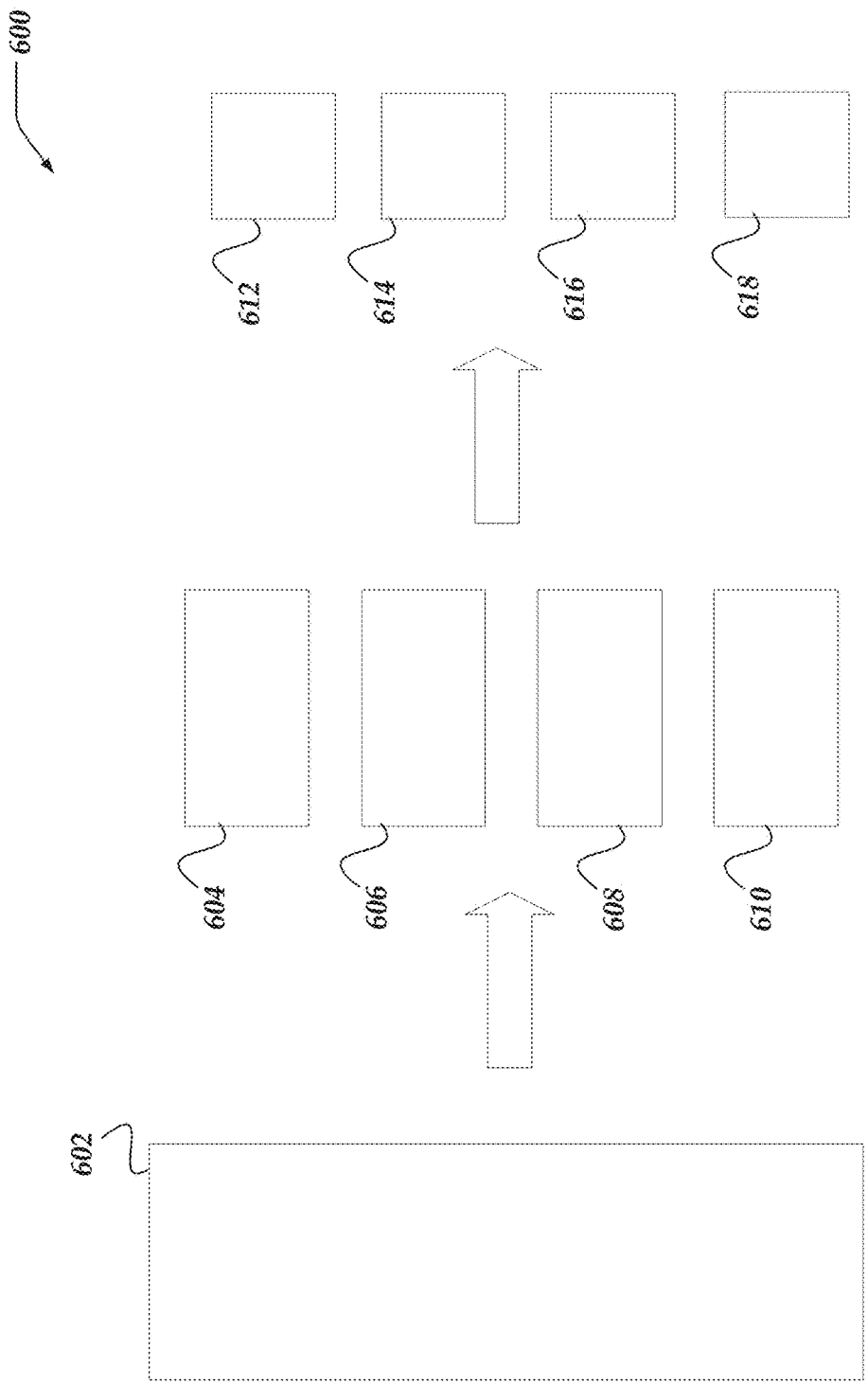
FIG. 6 illustrates a logical schematic of a system for summarizing conversational speech in accordance with one or more of the various embodiments.

FIG. 6 illustrates a logical schematic of system 600 for summarizing conversational speech in accordance with one or more of the various embodiments. In this example, for some embodiments, system 600 further illustrates: how a conversation stream, such as, conversation stream 602 may be segmented into one or more conversation segments, such as, conversation segment 604, conversation segment 606, conversation segment 608, conversation segment 610, or the like. And, in some embodiments, one or more summary profiles, such as, summary profile 612, summary profile 614, summary profile 616, summary profile 618, or the like, may be generated based on the conversation segments of conversations.

Figure 7:
FIG. 7 illustrates a logical schematic of a report for summarizing conversational speech in accordance with one or more of the various embodiments.

FIG. 7 illustrates a logical schematic of report 700 for summarizing conversational speech in accordance with one or more of the various embodiments. As described above, in some embodiments, summarization engines may be arranged to provide summary information to report engines, or the like, that may generate human readable reports. In this example, column 702 of report 700 represents a display of a transcript made from a conversation stream. Also, in this example, for some embodiments column 704 may be considered to represent summary information of the conversation transcript shown in column 702.

FIG. 8 illustrates a representation of data structure 800 for summarizing conversational speech in accordance with one or more of the various embodiments. As described above, in some embodiments, summarization engines may be arranged to generate summary profiles from one or more conversation segments. For brevity and clarity, in this example, data structure 800 is represented using JSON. However, one of ordinary skill in the art will appreciate that data structures used to represent summary profiles may be based on other data formats, including, XML, database tables, or the like. Likewise, in some embodiments, while data structure 800 is represent using object notation, other data structures, such as, arrays, lists, maps, dictionaries, or the like, may be employed to represent summary profiles without departing from the scope of the innovations declared herein.

In this example, for some embodiments, summary container 802 represents an array that may include information for one or more summary profiles, such as, summary profile 804 and summary profile 806. In some embodiments, summary profiles may be arranged to include various attributes that may comprise a summary profile. In some embodiments, such attributes may include identifiers associated with each summary profile, summary text, meta-data, or the like. Also, in some embodiments, summary profiles may include one or more attributes that contain references to portions of the conversation stream that may be associated with the summary text.

In some embodiments, metadata fields, such as, as metadata fields 808 may vary depending on the configuration of the summarization engines or the summarization models. In one or more of the various embodiments, metadata may include information provided or imported from one or more services associated with the conversation, the speakers, associated organizations, or the like. In some embodiments, metadata may include information such as, identity of the meeting host/leader, a list the speakers, a collection of topics addressed in the conversation, length of the source conversation, geographic information, localization information, or the like. For example, metadata may include one or more pointers/references to locations in the conversation stream that may correspond to one or more topics, speakers, or the like, in the conversation. In this example, the summarization engine may be considered to be configured to collect/determine metadata 808 for summary profile 804.

In one or more of the various embodiments, summarization engines may be configured to collect particular information for different applications, users, or organizations. For example, in some embodiments, a summary profile of a customer service telephone call may be configured to include one or more particular metrics associated with the call, including metrics related to indicating if a customer issue is resolved, metrics associated with mentions of critical topics, time of first mention, number of mentions, time of last mention, or the like), issue resolution status, adherence to scripts, or the like. Further, in some embodiments, summarization engines may be arranged to generate references to locations in the conversation stream that may be associated with the one or more metrics.

Accordingly, in some embodiments, summarization engines may be arranged to enable users to declare one or more features or metrics of a conversation to include in summary profiles. For example, in some embodiments, an organization may configure summary profiles to include information of particular or unique interest to the organization. Accordingly, in some embodiments, meta-data may vary depending on the user, organization, type or conversation, or the like. Also, in some embodiments, summarization models may be arranged include instructions for collecting or computing metadata from conversation segments.

In this example, for some embodiments, metadata 808 includes critical topic collection 810 for tracking information associated with one or more topics that may be deemed of interest. In some embodiments, summarization engines may be arranged to enable users or organization to provide a list of critical topics. Also, in some embodiments, summarization engines may be arranged to provide one or more pre-declared topics that may be tailored to particular conversation types or conversation subject matter.

As described above, text attribute 812 may be considered represent the summary text that may be determined for a conversation segment. In one or more of the various embodiments, the number of words included in summary text may vary depending on one or more of the source conversation segment, the summary models, or other configuration information. Accordingly, in some embodiments, the same conversation stream may result in different summary profiles depending on the summary models or other configuration information that may be applied to the conversation stream. For example, in some embodiments, general purpose summary models trained for non-specific conversations may provide different results than summary profiles trained for particular industries or specialized subject matter.

In one or more of the various embodiments, summary profiles may include references to portions of the conversation stream or conversation segment that may be associated with the summary text. In this example, messageRefs 814 represents a list of conversation portions that may be associated with the summary text in summary profile 804.

Accordingly, in some embodiments, summary profiles may be provided to report engines, or the like, that may interpret the summary profiles or otherwise render them for inclusion in one or more reports. Also, in some embodiments, references, such as, messageRefs 814, or the like, may enable interactive reports that enable users to click-thru to review the portions of the source conversation that may be associated with a summary profile.

Generalized Operations

Figure 9:
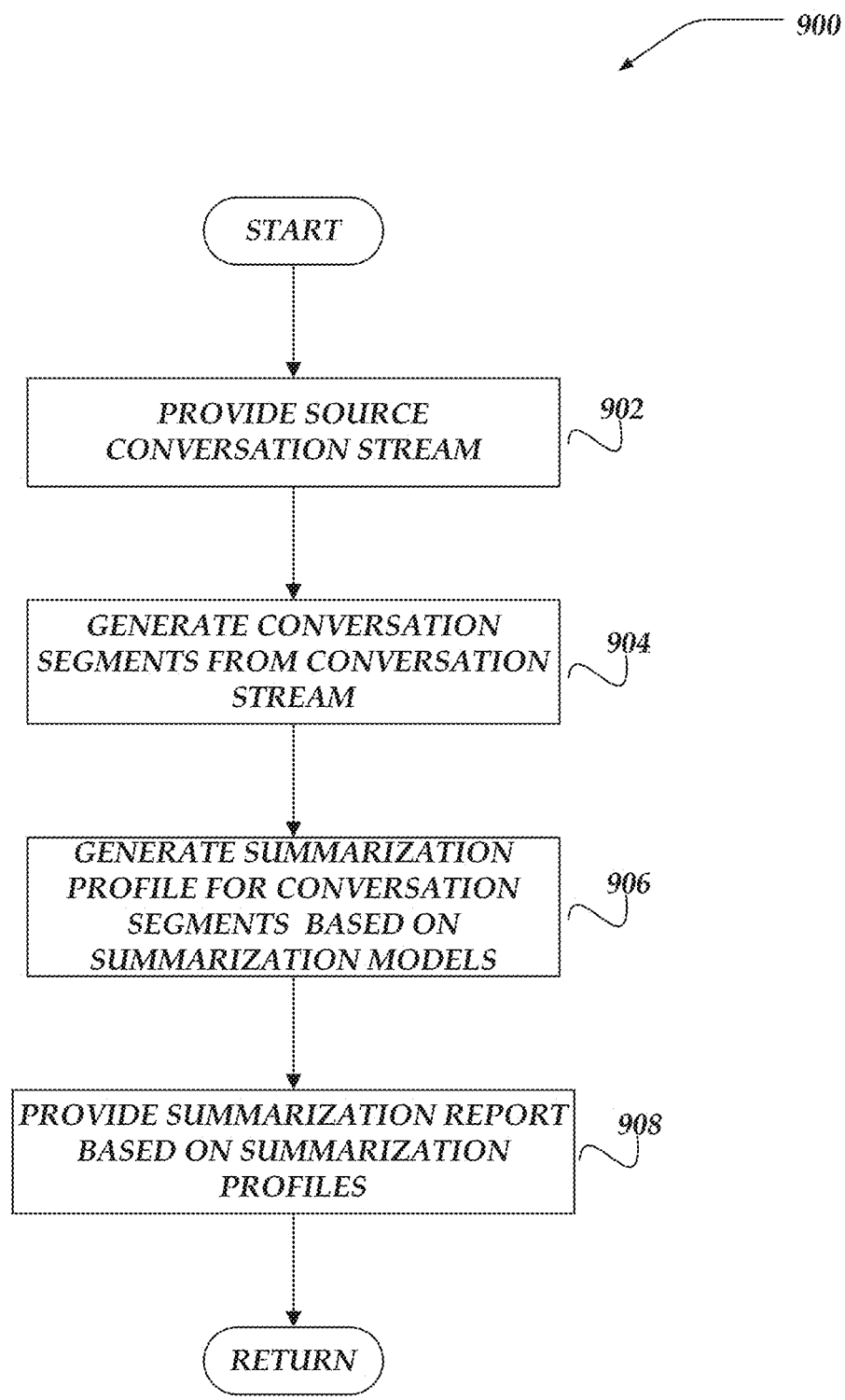
FIG. 9 illustrates an overview flowchart for a process for summarizing conversational speech in accordance with one or more of the various embodiments.
Figure 10:
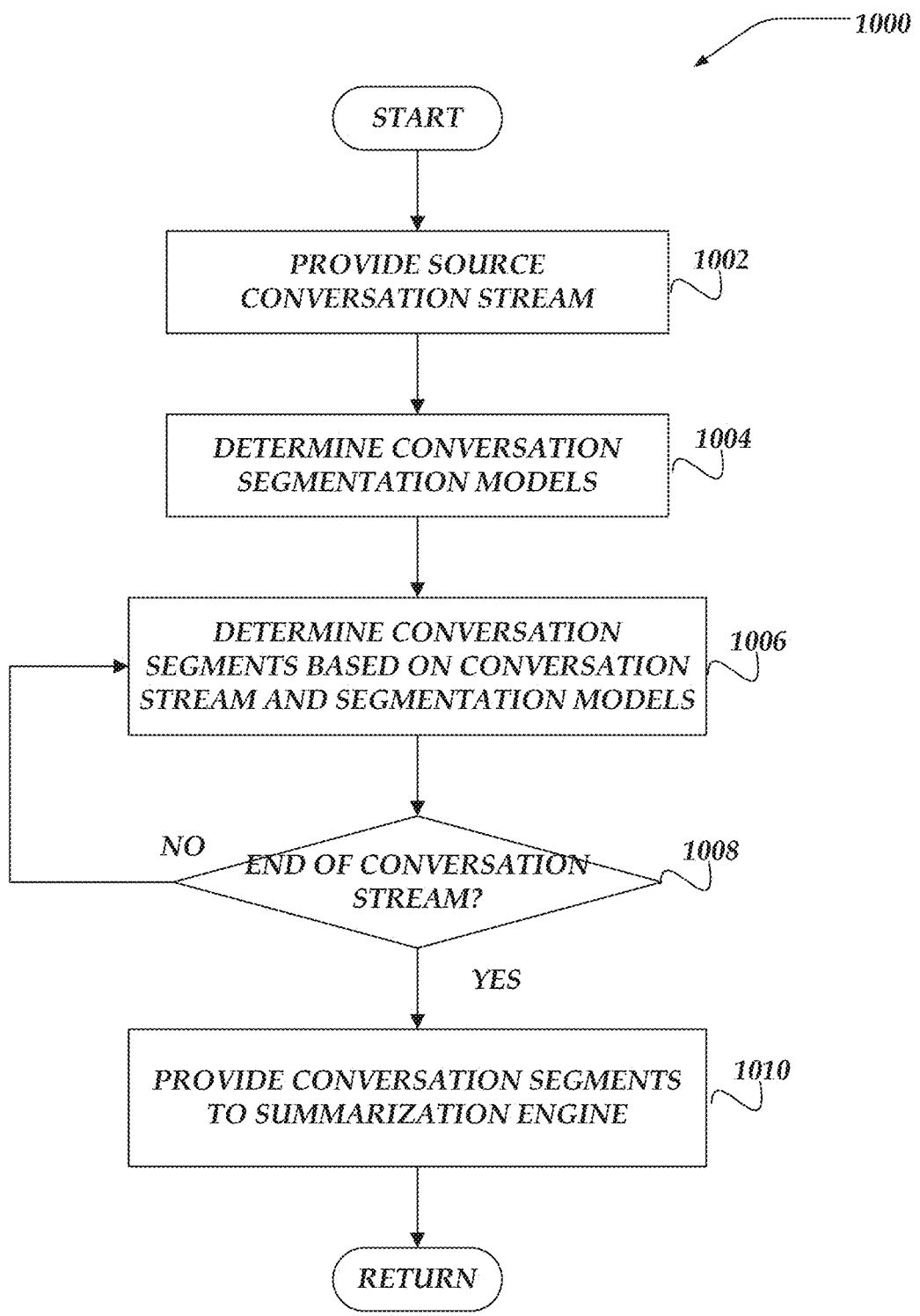
FIG. 10 illustrates a flowchart for a process for summarizing conversational speech in accordance with one or more of the various embodiments.
Figure 11:
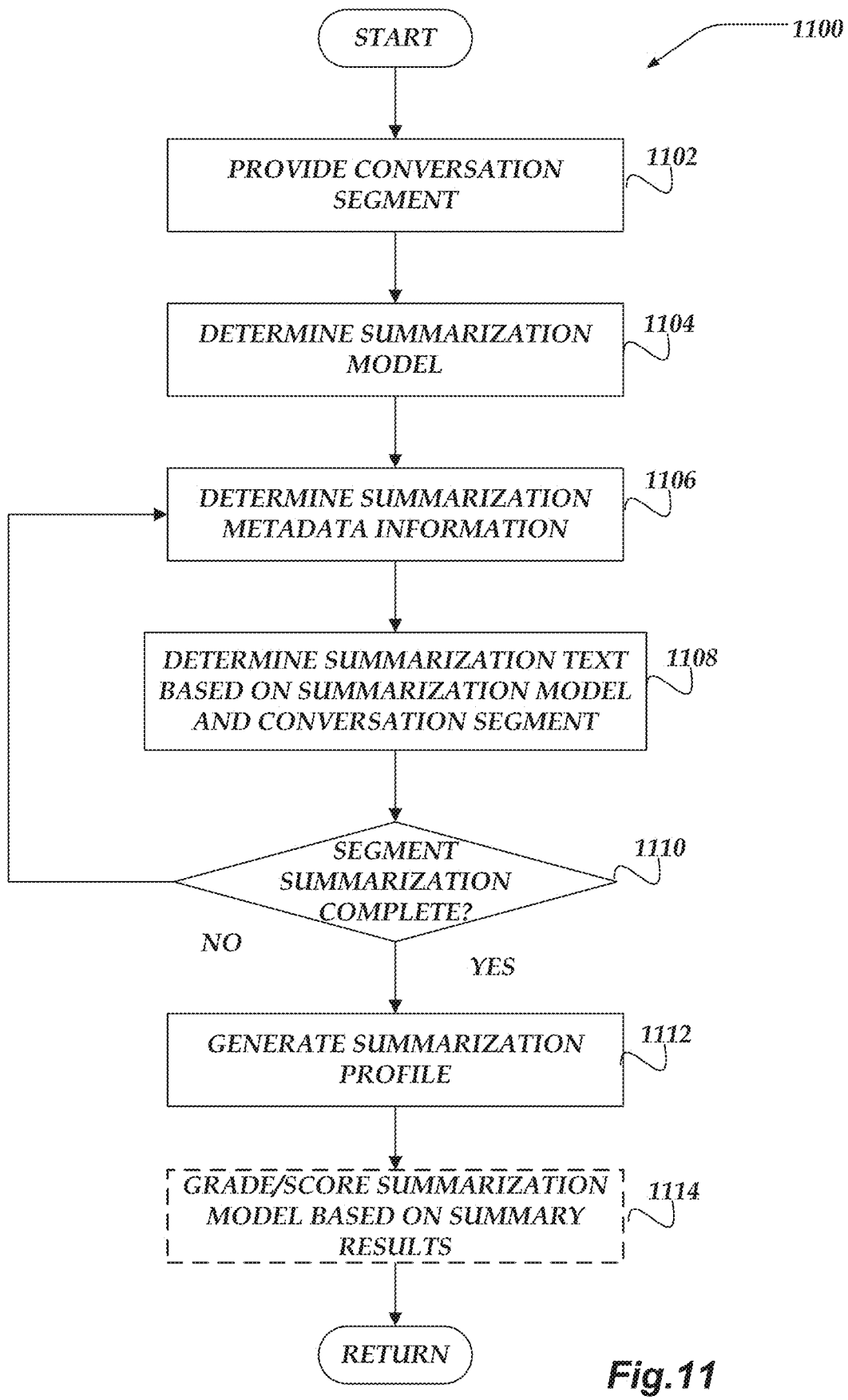
FIG. 11 illustrates a flowchart for a process for summarizing conversation speech in accordance with one or more of the various embodiments.

FIGS. 9-11 represent generalized operations for summarizing conversation speech in accordance with one or more of the various embodiments. In one or more of the various embodiments, processes 900, 1000, and 1100 described in conjunction with FIGS. 9-11 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-11 may be used for summarizing conversational speech in accordance with at least one of the various embodiments or architectures such as those described in conjunction with FIGS. 4-8. Further, in one or more of the various embodiments, some or all of the actions performed by processes 800, 900, 1000, and 1100 may be executed in part by analysis engine 322, summarization engine 324, report engine 326, segmentation engine 327, or the like, by one or more processors of one or more network computers.

FIG. 9 illustrates an overview flowchart for process 900 for summarizing conversational speech in accordance with one or more of the various embodiments. After a start block, at block 902, in one or more of the various embodiments, a source conversation stream may be provided to a speech analysis platform. In one or more of the various embodiments, a source conversation may be provided from a real-time audio stream of an ongoing conversation, meeting or presentation. In some cases, source conversations may include two or more persons. In other cases, source conversations may be one or more persons presenting or otherwise speaking to an audience. Also, in some embodiments, the source conversation may be provided via a recording of the conversation.

In one or more of the various embodiments, source conversations may be processed in real-time or in-advance to generate text from audio streams. In some embodiments, the speech-to-text processing may be performed by a third-party/external service. Also, in some embodiments, speech analysis engines may be arranged to execute one or more conventional or non-conventional speech-to-text processing techniques to convert audio streams of conversations into text before the conversation stream may be provided to a tracker engine.

In one or more of the various embodiments, analysis engines may be arranged to process text-based conversations word-by-word, sentence-by-sentence, paragraph-by-paragraph (snippets), or the like. In some embodiments, conversations may be provided with additional meta-data, including, timestamp/time-line markers, channel markers, vertical sync indicators, references or identifiers to portions/locations in the source stream, speaker identifiers, critical concepts, or the like. Also, in some embodiments, conversation words may be provided as a stream of text words. In some embodiments, conversation meta-data may include tags or markers that indicate conversational whitespace, such as, quiet periods, stops, starts, dead-air, or the like.

In some embodiments, text-based conversations may be considered to be text that has been generated from audio streams or video stream using a text-to-speech process, service, or the like. Also, in some embodiments, conversations may be provided from other conversation sources, such as, text chats, email, online forum posts/comments, or the like.

At block 904, in one or more of the various embodiments, segmentation engines may be arranged to determine one or more conversation segments based on the conversation stream. As described above, in some embodiments, segmentation engines may be arranged to employ one or more segmentation models that determine some or all of the criteria for segmenting a conversation stream. Note, in some cases, for some embodiments, a conversation stream may be considered a single conversation segment depending on the length or contents of a conversation.

At block 906, in one or more of the various embodiments, summarization engines may be arranged to generate one or more summarization profiles for the one or more conversation segments based on one or more summarization models. As described above, summarization profiles may include meta-data associated with the conversation or the conversation segment as well as summary text that summarizes the corresponding conversation segment.

At block 908, in one or more of the various embodiments, summarization engines may be arranged to provide a summarization report that includes the one or more one or more summarization profiles. Next, in one or more of the various embodiments, control may be returned to a calling process.

FIG. 10 illustrates a flowchart for process 1000 for summarizing conversational speech in accordance with one or more of the various embodiments. After a start block, at block 1002, in one or more of the various embodiments, the conversation stream may be provided to a segmentation engine. As described about, in some embodiments, a conversation stream may be provided to segmentation engines. In some embodiments, conversation streams may be provided in real-time while a conversation may be occurring. Also, in some embodiments, conversation stream may be based on a recorded conversation.

As described above, conversation streams may be converted from audio/video streams to text streams based on automated speech recognition systems. Further, in some cases, a conversation stream may be sourced from text-based chat systems, email exchanges, video streams, or the like.

At block 1004, in one or more of the various embodiments, segmentation engines may be arranged to determine one or more segmentation models. In one or more of the various embodiments, segmentation models may be comprised of instructions, NLP models, one or more heuristics, or the like, that may be configured to split a conversation stream into conversation segments.

In some embodiments, segmentation models may employ simple algorithms, such as, word counts, time/duration windows, or the like, for splitting conversation streams into conversation segments. Also, in some embodiments, one or more segmentation models may employ sophisticated algorithms based on NLP or machine learning that may determine conversation segments from conversation streams. In some embodiments, segmentation engines may be arranged to enable plug-ins, extensions, libraries, or the like, to be employed for determining the particular actions for determining conversation segments in a conversation stream. Accordingly, in some embodiments, different segmentation models may be employed in different contexts. In some embodiments, different segmentation models may be more or less effective for different types of meetings/conversations. Likewise, in some embodiments, different segmentation models may be tuned for different subject matter or different problem domains. For example, in some embodiments, segmentation models used for two-person customer service related conversations may be less effective for segmenting conversation streams obtained from multi-party corporate/engineering planning meetings.

At block 1006, in one or more of the various embodiments, segmentation engines may be arranged to determine one or more conversation segments based on the conversation stream and the one or more segmentation models. In some embodiments, segmentation engines such as segmentation engine 324 or segmentation engine 504 may be arranged to generate one or more conversation segments from a conversation stream.

In one or more of the various embodiments, segmentation engines may be arranged to discard portions of the conversation stream that may be determined to be superfluous or otherwise irrelevant. For example, in some embodiments, segmentation models may be arranged to recognize small talk or other side conversations that may be unrelated to primary gist of the conversation. In some embodiments, segmentation models may be configured to employ heuristics or trained machine learning models that identify conversation snippets related to the administration of a meeting. Thus, in some embodiments, such portions of the conversation may be excluded from conversation segments because they are not germane to the topics of interest. For example, in some embodiments, if portions of a conversation stream are related to adjusting microphones, video cameras, handing out documents, or the like, these portions may be identified as being unrelated to the topics of the conversation and therefore excluded from a conversation segment.

At decision block 1008, in one or more of the various embodiments, if the end of the conversation stream may be determined, control may flow to block 1010; otherwise, control may loop back to block 1006. In some embodiments, segmentation models may be configured to determine that a complete conversation segment has been identified based on criteria declared by the segmentation model.

At block 1010, in one or more of the various embodiments, segmentation engines may be arranged to provide the one or more conversation segments to one or more summarization engines. In some embodiments, segmentation engines or summarization engines may be hosted on separate computers (virtual or otherwise). Thus, in some cases, segmentation engines may be arranged communicate conversation segments to summarization engines over a network. Also, in some embodiments, segmentation engines may be arranged to store conversation segments in a database, file system, or the like. Accordingly, in some embodiments, summarization engines may be arranged to load conversation segments from the data store. In some embodiments, segmentation engines may be arranged to employ one or more APIs or interfaces provided by summarization engines or speech analysis platforms to communicate conversation segments to summarization engines.

Next, in one or more of the various embodiments, control may be returned to a calling process.

FIG. 11 illustrates a flowchart for process 1100 for summarizing conversation speech in accordance with one or more of the various embodiments. After a start block, at block 1102, in one or more of the various embodiments, conversation segments may be provided to summarization engines. As described above, segmentation engines may be arranged to generate one or more conversation segments from a conversation stream. Accordingly, in some embodiments, conversation segments may be provided to segmentation engines as they are generated. Also, in some embodiments, one or more conversation segments derived from a conversation stream may be collected and then provided at once to one or more segmentation engines.

In one or more of the various embodiments, speech analysis platforms may be arranged to enable two or more summarization engines to operate independently (e.g., in parallel) on some or all of the conversation segments.

At block 1104, in one or more of the various embodiments, summarization engines may be arranged to determine one or more summarization models. As described above, in some embodiments, different summarization models may be configured for different users, organizations, subject matter, summary profile specifications, or the like. In some embodiments, summarization engines may be configured to be associated with one or more particular summarization models for particular users, organizations, subject matter, summary profile specifications, or the like.

In one or more of the various embodiments, summarization engines may be arranged to execute one or more categorization models that include instructions, heuristics, machine-learning classifiers, or the like, to categorize incoming conversation segments. Accordingly, in some embodiments, summarization engines may be arranged to associate particular summarization models with particular categories of conversation segments.

Further, in some embodiments, speech analysis platforms may be arranged to provide one or more user interfaces that enable privileged users to manually associate one or more summarization models with a conversation stream. For example, in some embodiments, speech analysis platforms may enable online meeting hosts to select one or more pre-meeting options that may determine the summarization models.

In one or more of the various embodiments, summarization engines may be arranged to rank one or more summarization models based on quality scores that may be associated with the one or more summarization models. In some embodiments, summarization engine may be arranged to user interfaces that enable users to assign quality scores to summarization models. Also, in some embodiments, summarization engines may be arranged to employ one or more quality models that may assign quality scores based on summarization profiles. Accordingly, in some embodiments, quality models may comprise data structures that include one or more heuristics, classifiers, threshold values/parameters, or the like, that may be employed to automatically grade summarization models. Further, in some embodiments, one or more quality models may include instructions, rules, or the like, for modifying particular summarization models or for updating the determine summarization models. For example, in some embodiments, if a quality score associated with a first summarization model falls below a defined threshold value, summarization engines may be arranged to select another summarization model that may be associated with a higher quality score.

At block 1106, in one or more of the various embodiments, summarization engines may be arranged to determine summarization metadata information. In one or more of the various embodiments, summarization engines may be arranged to determine common metadata such as conversation segment identifiers, summarization profile identifiers, or the like.

Also, in some embodiments, one or more summarization models may be configured to determine various metadata, such as, number of speakers, speaker talk-times, speaker identifiers (e.g., usernames, email addresses, identifier numbers, or the like), or the like.

Also, in some embodiments, metadata may include information associated with one or more critical topics. Accordingly, in some embodiments, summarization models may be configured to determine one or more metrics or conversation features that may be associated with one or more concepts that may be deemed critical or otherwise important for a given application.

Accordingly, in some embodiments, summarization models may include a list of key words, key phrases, or the like, that may be associated with each concept of interest. In some embodiments, summarization engines may be arranged to employ one or more other services to determine concepts-of-interest from one or more declared vocabulary words. For example, in some embodiments, summarization engines may be enabled to engage a service that may be arranged to derive concepts from keywords or derive keywords from a concept label.

In one or more of the various embodiments, metadata associated with critical concepts may include information regarding various metrics, such as, talk-time associated with one or more of the critical concepts, speakers associated with one or more critical concepts, time-stamp/time-line information associated with relevant mentions of one or more of the critical concepts, or the like.

For example, in some embodiments, a summarization model may be configured to track if a customer service agent mentions one or more critical concepts, where in the conversation the critical concepts are mentioned, the amount of time in the conversation focused on the critical concepts, or the like.

In one or more of the various embodiments, summarization engines may be arranged to progressively determine meta-data as the conversation segment may be processed. Accordingly, in some embodiments, summarization engines may be arranged to update one or more metadata values/metrics as the conversation segment is being processed.

At block 1108, in one or more of the various embodiments, summarization engines may be arranged to determine summarization text based on the one or more summarization models and the conversation segment. As described above, summarization models may comprise various heuristics, machine-learning text summarization models, or the like, that are directed to summarizing text in conversation segments.

Accordingly, in one or more of the various embodiments, speech in the conversation segment may be summarized using one or more conventional machine-learning text summarization models. Also, in some embodiments, machine-learning text summarization models may be tuned or trained for particular problem domains, subject matter (e.g., customer service, medical/health, finance, or the like), conversation types (e.g., group meetings, two-person telephone calls, text-based chat sessions, or the like), local organizational needs, or the like. Further, in some embodiments, because conventional machine-learning text summarization models may be directed to text that is written, they may leverage language features, such as, grammar, parts-of-speech, punctuation, or the like. However, because speech in conversation segments is based on spoken words, the text summarization models may be modified to reduce the impact of grammar, or the like. For example, in some embodiments, speakers in meetings, video conferences, teleconferences, or the like, may use less formal language than used in written documents, or even email and text messaging. Accordingly, in some embodiments, conventional text summarization models may be adapted to support conversational speech by reducing the importance (or weight) of formal language rules.

Accordingly, in some embodiments, one or more weight scores may be associated with with one or more features of the one or more conversation segments. In some embodiments, summarization engines may be arranged to determine a portion of the one or more features that may be associated with one or more of a grammar, a figure of speech, punctuation, or other formal language rules. And, in some embodiments, summarization engines may be arranged to reduce the value of the one or more weight scores that may be associated with the one or more features associated with determined one or more of a grammar, a figure of speech, punctuation, or other formal language rules.

In one or more of the various embodiments, summarization models may be arranged to filter out some portions of the speech in a conversation segment from summarization based on various heuristics tuned to exclude small talk, off-topic side conversations, or the like.

At decision block 1110, in one or more of the various embodiments, if the summarization of the conversation segment is complete, control may flow to block 1112; otherwise, control may loop back to block 1106.

At block 1112, in one or more of the various embodiments, summarization engines may be arranged to generate a summarization profile for the conversation segment. As described above, in some embodiments, summarization engines may be arranged to include summary information of a conversation segment in one or more data structures that may be considered summarization profiles.

In some embodiments, if the summarization models employed to determine the summary information may be configured to collect metadata, this metadata may be included summarization profiles as well. In some embodiments, summarization engines may be arranged to generate summarization profiles using various formats including, JSON, XML, or the like. In some embodiments, summarization engines may be arranged to store summarization profiles directly into databases. Also, in some embodiments, summarization engines may be arranged to export summarization profiles as files or messages comprising JSON, XML, or the like. Further, in some embodiments, summarization engines may be arranged to support additional plug-ins, extensions, libraries, or the like, that enable additional summarization profile formatting or exporting. In some embodiments, summarization engines may be arranged to enable integration with one or more APIs of other services that may be provided the summarization profiles. Accordingly, in some embodiments, summarization engines may be arranged to employ plug-ins, extensions, libraries, or the like, provided via configuration information to account for local requirements or local circumstances.

At block 1114, in one or more of the various embodiments, optionally, summarization engines may be arranged to enable one or more users to grade or score summarization models based on summarization results. Accordingly, in some embodiments, summarization engines may be arranged to provide one or more user interfaces that enable one or more privileged users to grade or score the quality of the summarization information. Thus, in some embodiments, this grade/score may be employed to rank different summarization models against each other or otherwise measure the quality of summarization information generated for conversation segments.

In some embodiments, summarization engines may be arranged to modify one or more parameters or features of a summarization model based on the quality score. Likewise, in some embodiments, summarization engines may be arranged to discard one or more summarization models based on an associated quality score falling below a threshold value. Accordingly, in some embodiments, summarization engines may be arranged to progressively update individual summarization models or select different summarization models based on the quality information that contributed to its quality score.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing conversation information over a network, wherein one or more processors are configured to execute instructions that cause performance of the method, comprising:
    providing one or more conversation segments based on a conversation stream and one or more segmentation models;
    determining one or more summarization models based on one or more characteristics of the one or more conversation segments;
    generating summarization information for each of the conversation segments based on the one or more summarization models, wherein the summarization information includes a text-based summarization of the conversation segment;
    generating one or more summarization profiles for the one or more conversation segments based on the summarization information, wherein each summarization profile is associated with one or more quality scores;
    modifying the one or more summarization models based on the one or more summarization profiles and the associated one or more quality scores, wherein the one or more summarization profiles are updated based on the modified summarization models; and
    employing the one or more modified summarization models and the one or more updated summarization profiles to provide one or more reports to a user.

2. The method of claim 1, wherein determining the one or more summarization models further comprises:
    determining one or more of a subject matter or an industry market based on speech associated with the one or more conversation segments;
    categorizing the one or more conversation segments based on the one or more of the subject matter or the industry market; and
    further determining the one or more summarization models based on the categorization of the one or more conversation segments.

3. The method of claim 1, wherein generating the one or more summarization profiles, further comprises:
    determining one or more metrics based on the one or more summary models, wherein the one or more metrics include one or more of an indication of a status of a customer service issue, a timestamp associated with one or more mentions of a topic, a count of the number of mentions of a topic, or an adherence to a script score;
    determining one or more values for the one or more metrics based on the one or more summary models and the one or more conversation segments; and
    including the one or more metrics in the one or more summary profiles.

4. The method of claim 1, wherein providing the one or more conversation segments, further comprises:
    determining one or more portions of the conversation stream that are superfluous based on the one or more summarization models, wherein the one or more superfluous portions of the conversation include speech that is unrelated to a topic of the conversation, speech associated with administering the conversation, or speech associated with a side conversation; and excluding the one or more superfluous portions of the conversation stream from the one or more conversation segments.

5. The method of claim 1, wherein generating the summarization information for each of the conversation segments, further comprises:

determining one or more conversation types based on the one or more conversation segments based on the one or more summarization models, wherein the one or more conversation types include one or more of text from an email, text from a chat session, a two-person telephone call, a group meeting, or a presentation; and further generating the summarization information based on the one or more conversation types and the one or more summarization models.

6. The method of claim 1, wherein generating the summarization information for each of the conversation segments, further comprises:

associating one or more weight scores with one or more features of each of the conversation segments;

determining a portion of the one or more features that are associated with one or more of a grammar, a figure of speech, or punctuation; and reducing a value of the portion of the one or more weight score that are associated with the determined portion of the one or more features.

7. The method of claim 1, wherein generating the one or more summarization profiles, further comprises:

providing metadata information based on the conservation stream and one or more conversations associated with the conversation stream, wherein the metadata information includes one or more of a list of speakers, a name of the host or leader of the conversation, a duration of the one or more conversations, a list of topics discussed in the one or more conversations, geographic information associated with the conversation, or localization information.

8. A network computer for managing conversation information over a network, comprising:

a memory that stores at least instructions; and one or more processors that execute instructions that perform actions, including:

providing one or more conversation segments based on a conversation stream and one or more segmentation models;

determining one or more summarization models based on one or more characteristics of the one or more conversation segments;

generating summarization information for each of the conversation segments based on the one or more summarization models, wherein the summarization information includes a text-based summarization of the conversation segment;

generating one or more summarization profiles for the one or more conversation segments based on the summarization information, wherein each summarization profile is associated with one or more quality scores;

modifying the one or more summarization models based on the one or more summarization profiles and the associated one or more quality scores, wherein the one or more summarization profiles are updated based on the modified summarization models; and employing the one or more modified summarization models and the one or more updated summarization profiles to provide one or more reports to a user.

9. The network computer of claim 8, wherein determining the one or more summarization models further comprises:

determining one or more of a subject matter or an industry market based on speech associated with the one or more conversation segments;

categorizing the one or more conversation segments based on the one or more of the subject matter or the industry market; and further determining the one or more summarization models based on the categorization of the one or more conversation segments.

10. The network computer of claim 8, wherein generating the one or more summarization profiles, further comprises:

determining one or more metrics based on the one or more summary models, wherein the one or more metrics include one or more of an indication of a status of a customer service issue, a timestamp associated with one or more mentions of a topic, a count of the number of mentions of a topic, or an adherence to a script score;

determining one or more values for the one or more metrics based on the one or more summary models and the one or more conversation segments; and including the one or more metrics in the one or more summary profiles.

11. The network computer of claim 8, wherein providing the one or more conversation segments, further comprises:

determining one or more portions of the conversation stream that are superfluous based on the one or more summarization models, wherein the one or more superfluous portions of the conversation include speech that is unrelated to a topic of the conversation, speech associated with administering the conversation, or speech associated with a side conversation; and excluding the one or more superfluous portions of the conversation stream from the one or more conversation segments.

12. The network computer of claim 8, wherein generating the summarization information for each of the conversation segments, further comprises:

determining one or more conversation types based on the one or more conversation segments based on the one or more summarization models, wherein the one or more conversation types include one or more of text from an email, text from a chat session, a two-person telephone call, a group meeting, or a presentation; and further generating the summarization information based on the one or more conversation types and the one or more summarization models.

13. The network computer of claim 8, wherein generating the summarization information for each of the conversation segments, further comprises:

associating one or more weight scores with one or more features of each of the conversation segments;

determining a portion of the one or more features that are associated with one or more of a grammar, a figure of speech, or punctuation; and reducing a value of the portion of the one or more weight score that are associated with the determined portion of the one or more features.

14. The network computer of claim 8, wherein generating the one or more summarization profiles, further comprises:

providing metadata information based on the conservation stream and one or more conversations associated with the conversation stream, wherein the metadata information includes one or more of a list of speakers, a name of the host or leader of the conversation, a duration of the one or more conversations, a list of topics discussed in the one or more conversations, geographic information associated with the conversation, or localization information.

15. A processor readable non-transitory storage media that includes instructions for managing conversation information over a network, wherein execution of the instructions by one or more hardware processors performs actions, comprising:
   providing one or more conversation segments based on a conversation stream and one or more segmentation models;
   determining one or more summarization models based on one or more characteristics of the one or more conversation segments;
   generating summarization information for each of the conversation segments based on the one or more summarization models, wherein the summarization information includes a text-based summarization of the conversation segment;
   generating one or more summarization profiles for the one or more conversation segments based on the summarization information, wherein each summarization profile is associated with one or more quality scores;
   modifying the one or more summarization models based on the one or more summarization profiles and the associated one or more quality scores, wherein the one or more summarization profiles are updated based on the modified summarization models; and
   employing the one or more modified summarization models and the one or more updated summarization profiles to provide one or more reports to a user.

16. The media of claim 15, wherein determining the one or more summarization models further comprises:
   determining one or more of a subject matter or an industry market based on speech associated with the one or more conversation segments;
   categorizing the one or more conversation segments based on the one or more of the subject matter or the industry market; and
   further determining the one or more summarization models based on the categorization of the one or more conversation segments.

17. The media of claim 15, wherein generating the one or more summarization profiles, further comprises:
   determining one or more metrics based on the one or more summary models, wherein the one or more metrics include one or more of an indication of a status of a customer service issue, a timestamp associated with one or more mentions of a topic, a count of the number of mentions of a topic, or an adherence to a script score;
   determining one or more values for the one or more metrics based on the one or more summary models and the one or more conversation segments; and
   including the one or more metrics in the one or more summary profiles.

18. The media of claim 15, wherein providing the one or more conversation segments, further comprises:
   determining one or more portions of the conversation stream that are superfluous based on the one or more summarization models, wherein the one or more superfluous portions of the conversation include speech that is unrelated to a topic of the conversation, speech associated with administering the conversation, or speech associated with a side conversation; and
   excluding the one or more superfluous portions of the conversation stream from the one or more conversation segments.

19. The media of claim 15, wherein generating the summarization information for each of the conversation segments, further comprises:
   determining one or more conversation types based on the one or more conversation segments based on the one or more summarization models, wherein the one or more conversation types include one or more of text from an email, text from a chat session, a two-person telephone call, a group meeting, or a presentation; and
   further generating the summarization information based on the one or more conversation types and the one or more summarization models.

20. The media of claim 15, wherein generating the summarization information for each of the conversation segments, further comprises:
   associating one or more weight scores with one or more features of each of the conversation segments;
   determining a portion of the one or more features that are associated with one or more of a grammar, a figure of speech, or punctuation; and
   reducing a value of the portion of the one or more weight score that are associated with the determined portion of the one or more features.

21. The media of claim 15, wherein generating the one or more summarization profiles, further comprises:
   providing metadata information based on the conservation stream and one or more conversations associated with the conversation stream, wherein the metadata information includes one or more of a list of speakers, a name of the host or leader of the conversation, a duration of the one or more conversations, a list of topics discussed in the one or more conversations, geographic information associated with the conversation, or localization information.

22. A system for managing conversation information over a network, comprising:
   a network computer, comprising:
      a memory that stores at least instructions; and
      one or more processors that execute instructions that perform actions, including:
         providing one or more conversation segments based on a conversation stream and one or more segmentation models;
         determining one or more summarization models based on one or more characteristics of the one or more conversation segments;
         generating summarization information for each of the conversation segments based on the one or more summarization models, wherein the summarization information includes a text-based summarization of the conversation segment;
         generating one or more summarization profiles for the one or more conversation segments based on the summarization information, wherein each summarization profile is associated with one or more quality scores;
         modifying the one or more summarization models based on the one or more summarization profiles and the associated one or more quality scores, wherein the one or more summarization profiles are updated based on the modified summarization models; and employing the one or more modified summarization models and the one or more updated summarization profiles to provide one or more reports to a user; and a client computer, comprising:
another memory that stores at least instructions; and
one or more processors that execute instructions that perform actions, including:
displaying the one or more reports to the user.

23. The system of claim 22, wherein determining the one or more summarization models further comprises:
determining one or more of a subject matter or an industry market based on speech associated with the one or more conversation segments;
categorizing the one or more conversation segments based on the one or more of the subject matter or the industry market; and
further determining the one or more summarization models based on the categorization of the one or more conversation segments.

24. The system of claim 22, wherein generating the one or more summarization profiles, further comprises:
determining one or more metrics based on the one or more summary models, wherein the one or more metrics include one or more of an indication of a status of a customer service issue, a timestamp associated with one or more mentions of a topic, a count of the number of mentions of a topic, or an adherence to a script score;
determining one or more values for the one or more metrics based on the one or more summary models and the one or more conversation segments; and
including the one or more metrics in the one or more summary profiles.

25. The system of claim 22, wherein providing the one or more conversation segments, further comprises:
determining one or more portions of the conversation stream that are superfluous based on the one or more summarization models, wherein the one or more superfluous portions of the conversation include speech that is unrelated to a topic of the conversation, speech associated with administering the conversation, or speech associated with a side conversation; and
excluding the one or more superfluous portions of the conversation stream from the one or more conversation segments.

26. The system of claim 22, wherein generating the summarization information for each of the conversation segments, further comprises:
determining one or more conversation types based on the one or more conversation segments based on the one or more summarization models, wherein the one or more conversation types include one or more of text from an email, text from a chat session, a two-person telephone call, a group meeting, or a presentation; and
further generating the summarization information based on the one or more conversation types and the one or more summarization models.

27. The system of claim 22, wherein generating the summarization information for each of the conversation segments, further comprises:
associating one or more weight scores with one or more features of each of the conversation segments;
determining a portion of the one or more features that are associated with one or more of a grammar, a figure of speech, or punctuation; and
reducing a value of the portion of the one or more weight score that are associated with the determined portion of the one or more features.

28. The system of claim 22, wherein generating the one or more summarization profiles, further comprises:
providing metadata information based on the conservation stream and one or more conversations associated with the conversation stream, wherein the metadata information includes one or more of a list of speakers, a name of the host or leader of the conversation, a duration of the one or more conversations, a list of topics discussed in the one or more conversations, geographic information associated with the conversation, or localization information.

\* \* \* \* \*